United States Patent [19]

Gunesin et al.

[11] Patent Number: 4,689,367

[45] **Date of Patent: * Aug. 25, 1987**

[54] P-METHYLSTYRENE POLYMER BLENDS

[75] Inventors: Binnur Z. Gunesin, Warren; Alex W. Kawczak, Plainsboro, both of N.J.

[73] Assignee: Mobil Oil Corporation, New York, N.Y.

[ * ] Notice: The portion of the term of this patent subsequent to Mar. 5, 2002 has been disclaimed.

[21] Appl. No.: 837,930

[22] Filed: Mar. 4, 1986

Related U.S. Application Data

[63] Continuation-in-part of Ser. No. 678,206, Dec. 5, 1984, abandoned, which is a continuation-in-part of Ser. No. 558,233, Dec. 5, 1983, Pat. No. 4,503,187.

[51] Int. Cl.[4] ........................ C08L 23/04; C08L 25/16

[52] U.S. Cl. ........................................ 525/240; 525/70; 525/71; 525/86; 525/98

[58] Field of Search ........................ 525/240, 98, 70, 71

[56] References Cited

U.S. PATENT DOCUMENTS

| | | | |
|---|---|---|---|
| 2,694,692 | 11/1954 | Amos et al. | 260/45.5 |
| 3,894,117 | 7/1975 | Agouri et al. | 525/98 |
| 3,959,239 | 5/1976 | Butter et al. | 526/25 |
| 4,031,166 | 6/1977 | Bronstert et al. | 260/876 B |
| 4,086,287 | 4/1978 | Kaeding et al. | 260/671 |
| 4,188,432 | 2/1980 | Holden et al. | 428/35 |
| 4,255,531 | 3/1981 | Arbit | 525/237 |
| 4,260,694 | 4/1981 | Schwab | 525/314 |
| 4,275,179 | 6/1981 | Sherman | 525/98 |
| 4,306,049 | 12/1981 | Prapas | 526/347 |
| 4,352,908 | 10/1982 | Murray | 525/98 |
| 4,386,187 | 5/1983 | Grancio et al. | 525/96 |
| 4,397,988 | 8/1983 | Sherman | 525/98 |
| 4,503,187 | 3/1985 | Gunesin et al. | 525/98 |

FOREIGN PATENT DOCUMENTS 1054301 1/1967 United Kingdom .

OTHER PUBLICATIONS

Paul-"Compatibilizers for Polymer Blends" 1978, pp. 35-37 & 50-52.

Chemical Week 2/82, "A Better Styrene", pp. 42-45.

New Materials—12/79 Plastics World, p. 86.

New Polyethylenes—2/80 Package Engineering, pp. 39-40.

G. A. Cook, *Survey of Modern Industrial Chemistry,* Ann Arbor Science Publishers, Inc., 1975, pp. 252-254.

P. Wiseman, *An Introduction to Industrial Organic Chemistry,* John Wiley & Sons, 1976, pp. 288-289, 306.

D. R. Paul, "Compatibilizers for Polymer Blends", *Polymer Blends,* vol. 2, 1978, pp. 35-37 and 50-52.

*Primary Examiner*—Carman J. Seccuro

*Attorney, Agent, or Firm*—Alexander J. McKillop; Michael G. Gilman; Charles J. Speciale

[57] ABSTRACT

This invention provides a high molecular weight copolymer blend of polyethylene and poly(para-methylstyrene) in the absence of any compatibilizing agent. Preferably, the polyethylene is linear low density polyethylene.

8 Claims, 4 Drawing Figures

P-METHYLSTYRENE POLYMER BLENDS

CROSS REFERENCE TO RELATED APPLICATIONS

This is a continuation-in-part of Application Ser. No. 678,206, filed Dec. 5, 1984, now abandoned, which in turn is a continuation-in-part of Application Ser. No. 558,233, filed Dec. 5, 1983, now U.S. Pat. No. 4,503,187 issued Mar. 5, 1985.

FIELD OF THE INVENTION

The present invention is directed to blends of polyethylene and poly(para-methylstyrene), hereinafter referred to as poly(p-methylstyrene) or PPMS, and particularly to blends of linear low density polyethylene (LLDPE) and PPMS.

DESCRIPTION OF PRIOR ART

Blending PPMS with other polymers is known to the art. For example, it has previously been disclosed to blend PPMS and polystyrene (PS) with conjugated polydienes (U.S. Pat. No. 4,352,908), a conjugated diene, such as isoprene or butadiene (U.S. Pat. Nos. 4,260,694 and 4,397,988), or a styrene-conjugated diolefin block copolymer such as styrene-butadiene-styrene (U.S. Pat. No. 4,275,179). The above-mentioned references are incorporated herein by reference.

Blending polyethylene (PE) and PPMS is also disclosed in the prior art. U.S. Pat. No. 4,255,531 to Arbit discloses blends of PPMS and a maximum of 10 wt % PE. PE is added to the PPMS to induce crosslinking by irradiation. Parent Application Ser. No. 558,233, now U.S. Pat. No. 4,503,187, is directed to a blend of PPMS and a polyethylene (PE) in the presence of a compatibilizing agent.

However, the blends poly(p-methylstyrene) and polyethylene, particularly LLDPE, in the right proportion have been found to have superior properties in terms of impact strength, elongation, etc. over polystyrene, poly(p-methylstyrene), blends of polystyrene and polyethylene and blends of PPMS and PE, in which the PE was added in small amounts to induce crosslinking by irradiation. The present invention is directed to blends of PPMS and PE, without the added component of a compatibilizing agent.

SUMMARY OF THE INVENTION

The present invention provides a high molecular weight blend having high impact strength and superior heat distortion properties produced by blending specified quantities of polyethylene and poly(p-methylstyrene). The present invention further provides a method of making the above-described blend, the method including the steps of blending polyethylene, particularly LLDPE, in poly(p-methylstyrene) at temperatures in the range of 175°-270° C. The component blend should contain at least 20 wt % PE and at least about 40 wt % PPMS. Preferably, the ratio of PE to PPMS is about 40:60 to 60:40 and most preferably 50:50.

DETAILED DESCRIPTION OF THE INVENTION

Figure 1:
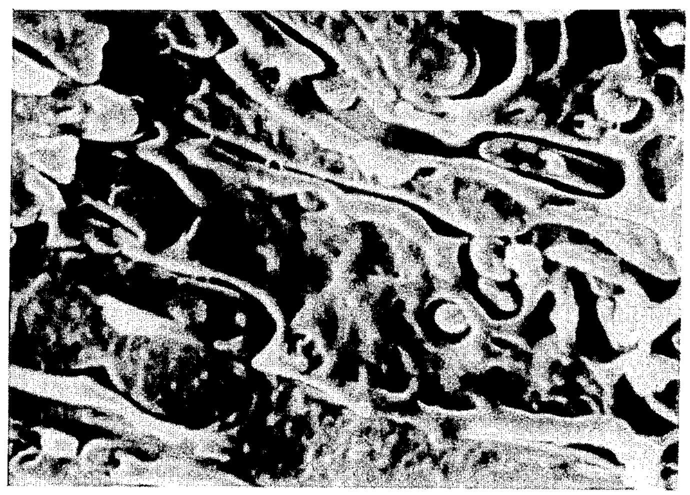
FIG. 1 is an electron photomicrograph (10,000×) of a 50:50 PS/LLDPE blend without compatibilizing agent.

An essential monomer component in preparing the polymers used in this invention is p-methylstyrene. It is within the contemplation of this invention to use mixtures of methylstyrene isomers rich in p-methylstyrene. Such mixtures contain at least 90 wt %, preferably 95 wt %, more preferably 97 or greater wt %, p-metylstyrene and less than 0.1 wt % o-methylstyrene, with the balance being m-methylstyrene. A typical mixture contains, by weight, about 97% p-methylstyrene, about 3% m-methylstyrene and about 0.05% o-methylstyrene. The mixtures are obtained by catalytic dehydrogenation of the mixtures of ethylmethyl benzene isomers, described in U.S. Pat. No. 4,086,287 is incorporated herein by reference. Homopolymers and copolymers prepared from p-methylstyrene are prepared in the known manner, utilizing methods analogous to those long used for the preparation of polystyrene and styrene copolymers. The preparation of poly(p-methylstyrene)-homopolymers, graft (impact) copolymers and random copolymers of styrene and p-methylstyrene is described in U.S. Pat. No. 4,306,049, which is incorporated herein by reference. Useful comonomers include acrylic monomers, particularly acrylonitrile, acrylic acid and methacrylic acid esters, such as methyl methacrylate.

The other blend component necessary for the production of the polymers in this invention is polyethylene. Polyethylene is well known in the art and is commercially available in bulk. Generally, polyethylene is divided into two classes: high density and low density. The density depends upon the degree of linearity and crystallinity of the polymer. High-density polyethylene is mostly linear and crystalline, and the low-density polyethylene is about half-branched and much less crystalline. More complete descriptions of polyethylene may be found in Cook, G. A., *Survey of Modern Industrial Chemistry,* Ann Arbor Science Publishers, Inc., 1975, pp. 252-254, and Wiseman, P., *An Introduction to Industrial Organic Chemistry,* John Wiley & Sons, 1976, pp. 288-289, 306, both of which are incorporated herein by reference. It is within the scope of this invention to use a variety of forms of polyethylene, including low density polyethylene (LDPE), linear low density polyethylene (LLDPE), and high density polyethylene (HDPE). LLDPE, in which the higher olefins contain 4 to 10 carbon atoms, and preferably 4 to 6 carbon atoms, is the polyethylene of choice of this invention. LLDPE exhibits certain beneficial properties, such as better environmental stress crack resistance (ESCR) than the other polyethylenes mentioned.

The weight percent ratio of the blend can be varied. Generally, the blend of the instant invention will contain PPMS at a level from 40 to 80 wt % and PE from 20 to 60 wt %. Preferably, the PPMS and PE are present in the blend in a 50:50 wt % ratio.

Blending of the polymers is accomplished by procedures well known in the art, including mixing the polymers in a Brabender mixer, extruder or in a 2-roll differential speed mixer. The blend temperature for PE falls within the range of 150° to 200° C., preferably 160° C., and for PPMS within the range of 175° to 270° C., preferably 200° C. Although PPMS and PE may be blended simultaneously, it is preferred to preheat the PE for 5 to 15 minutes and then add PPMS. This latter method enhances the "adhesive" properties between the PE and PPMS, thus creating greater interfacial adhesion of polymers. At temperatures in the vicinity of 160° C., PE sheets very well and forms a clear film. Finally, PPMS is added. As the viscosity of the blend increases with the addition of the PPMS, it is advantageous to increase the blending temperature to preferably 200° C.

The blends of the present invention exhibit high impact strength and superior heat distortion properties. In general, the blends of the present invention will also have increased impact strength over blends of PPMS and polystyrene.

The blends are particularly suited for applications in which high impact polystyrene and high impact poly(p-methylstyrene) is used. Representative examples for the product formed in the present invention include dairy product containers, detergent and oil containers, and refrigerator liners.

The following examples are given in order that the invention may be more fully understood. Proportions and percentages are given by weight. The properties of the resulting polymers were tested under the conditions of the American Standard Test Method (ASTM).

EXAMPLE 1

Preparation of a Comparative Polymer Blend from a 50/50 Mixture of Polystyrene (PS) and Linear Low Density Polyethylene (LLDPE)

The polymer in Example 1 had the following composition (weight percent):

| | |
|---|---|
| PS | 50 |
| LLDPE | 50 |

LLDPE was melted and sheeted in a roll mill at a temperature of 160° C. for approximately 5 minutes. At this point, the LLDPE was characterized by excellent sheeting tendencies on the rollers and a transparent appearance. PS was then blended with the LLDPE at a temperature of 200° C. for a period of time of about 10 minutes. The product blend was then removed from the roll mill, cooled to room temperature and pelletized.

The properties of the resultant blend are compared to the properties of PS alone and PPMS alone as follows:

| | PS | PPMS | PS/LLDPE |
|---|---|---|---|
| Izod Notched ⅛" Impact (ft-lb/in) | 0.3 | 0.3 | 0.64 |
| Gardner Impact Strength (in-lbs) | — | — | 51 |
| Elongation (%) | 3.5 | 2.8 | 7.2 |
| Tensile Strength (psi) | 8012 | 6611 | 3246 |
| Yield Strength (psi) | — | — | 3542 |

EXAMPLE 2

Preparation of a Control Polymer Blend From a 50/50 Mixture of Poly(p-methylstyrene) (PPMS) and LLDPE The polymer in Example 2 had the following composition (weight percent):

| | |
|---|---|
| PPMS | 50 |
| LLDPE | 50 |

The blend was prepared using the same method of Example 1, substituting LLDPE for PE, and PPMS for PS. The properties of the resultant blend were as follows:

| | |
|---|---|
| Izod Notched ⅛" Impact (ft-lb/in) | 0.94 |
| Tensile Strength (psi) | 3,390 |
| Yield Strength (psi) | 3,550 |
| Elongation (%) | 8.8 |
| Tensile Modulus (psi) | 173,000 |
| Gardner Impact Strength (in-lbs) | 62 |

EXAMPLE 3

Preparation of PPMS-LLDPE Blend With 5% Styrene-hydrogenated Butadiene Block Copolymer Compatibilizing Agent The blend in Example 3 had the following composition (weight percent):

| | |
|---|---|
| PPMS | 47.5 |
| LLDPE | 47.5 |
| Compatibilizing Agent (Shellviz-40) | 5.0 |

This blend was prepared using the same method of Example 2, with the exception that the compatibilizing agent (molecular weight 120,000; styrene content 30 wt %) was blended with LLDPE for 5 minutes prior to the addition of PPMS. The final mixture was blended together for 10 minutes.

The properties of the final blend were as follows:

| | |
|---|---|
| Izod Notched ⅛" Impact (ft-lb/in) | 5.1 |
| Tensile Strength (psi) | 3,300 |
| Yield Strength (psi) | 3,470 |
| Elongation (%) | 9.7 |
| Tensile Modulus (psi) | 170,000 |

EXAMPLE 4

Preparation of PPMS-LLDPE-Compatibilizing Agent Blend

The blend in Example 4 had the following composition (weight percent):

| | |
|---|---|
| PPMS | 45 |
| LLDPE | 45 |
| Compatibilizing Agent | 10 |

This blend was prepared using the same method and the same monomers employed in Example 3, but different weight percents. The properties of the final blend were as follows:

| Izod Notched ⅛" Impact (ft-lb/in) | 7.61 |
|---|---|
| Tensile Strength (psi) | 2,850 |
| Yield Strength (psi) | 2,850 |
| Elongation (%) | 9.6 |
| Tensile Modulus (psi) | 140,000 |

EXAMPLE 5

Preparation of High Impact Poly(p-methylstyrene) (HIPPMS) and LLDPE Blend

The blend in Example 5 had the following composition (weight percent):

| HIPPMS | 90 |
|---|---|
| LLDPE | 10 |

The mixture was prepared using the same method employed in Example 2. The properties of the final blend were as follows:

| Izod Notched ⅛" Impact (ft-lb/in) | 0.971 |
|---|---|
| Tensile Strength (psi) | 3,600 |
| Yield Strength (psi) | 3,200 |
| Elongation (%) | 25 |
| Tensile Modulus (psi) | 204,000 |

EXAMPLE 6

Preparation of Blend From Mixture of HIPPMS, LLDPE, and Compatibilizing Agent The blend in Example 6 had the following composition (weight percent):

| HIPPMS | 85 |
|---|---|
| LLDPE | 10 |
| Compatibilizing Agent | 5 |

The blend of Example 6 was prepared using the same method employed in Example 3. The compatibilizing agent was the same as in Example 3.

The properties of the final blend were as follows:

| Izod Notched ⅛" Impact (ft-lb/in) | 4.45 |
|---|---|
| Tensile Strength (psi) | 3,520 |
| Yield Strength (psi) | 3,370 |
| Elongation (%) | 25.1 |
| Tensile Modulus (psi) | 198,000 |

The following Examples were designed to compare the different characteristics of polymers in which polystyrene has been substituted for PPMS. The tests were run simultaneously under the same conditions.

EXAMPLE 7

Preparation of Control Blend From PPMS-LLDPE-Compatibilizing Agent

The blend of Example 7 has the following composition (weight percent):

| PPMS | 47.5 |
|---|---|
| LLDPE | 47.5 |
| Compatibilizing Agent | 5.0 |

The blend of Example 7 was prepared using the same method employed in Example 3. The properties of the resulting polymer blend were as follows:

| Izod Notched ⅛" Impact (ft-lb/in) | 2.54 |
|---|---|
| Gardner Impact (ft/lb) | 160 |
| Tensile Strength (psi) | 2,850 |
| Yield Strength (psi) | 2,850 |
| Elongation (%) | 14.6 |

EXAMPLE 8

Preparation of Blend From Mixture of Polystryene, LLDPE, and Compatibilizing Agent The blend of Example 8 had the following composition (weight percent):

| Polystyrene | 47.5 |
|---|---|
| LLDPE | 47.5 |
| Compatibilizing Agent | 5 |

The blend of Example 8 was prepared using the same method employed in Example 3. The properties of the final blend were as follows:

| Izod Notched ⅛" Impact (ft-lb/in) | 1.70 |
|---|---|
| Gardner Impact (ft/lb) | 108 |
| Tensile Strength (psi) | 2,420 |
| Yield Strength (psi) | 2,370 |
| Elongation (%) | 6.6 |

COMPARATIVE TESTS

Samples of PPMS and PS blends with LLDPE were fractured under liquid nitrogen, cross-sectioned and observed by scanning electron microscopy. FIGS. 1-4 are actual scanning electron microscopy photographs of the polymer blends taken at magnifications of 10,000× (FIGS. 1, 3 and 4) and 5,000× (FIG. 2).

Figure 2:
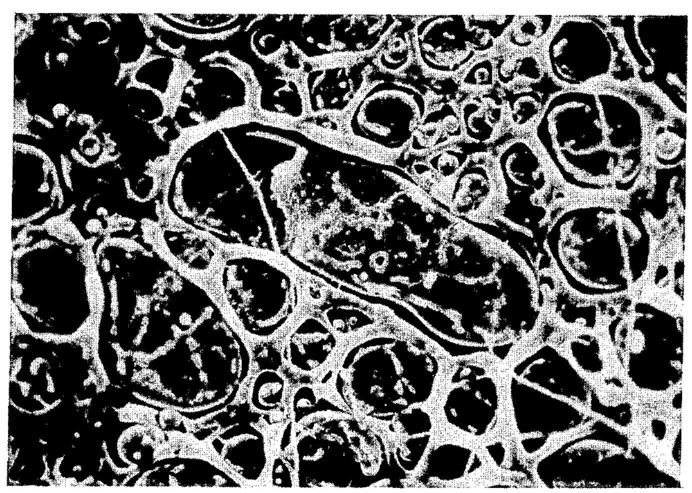
FIG. 2 is an electron photomicrograph (5,000×) of a 50:50 PPMS/LLDPE blend without compatibilizing agent.

Comparing FIGS. 1 and 2, it can be seen that the 50:50 PPMS/LLDPE blend without compatibilizing agent from Example 2 above (FIG. 2) presents a more ordered state of morphology than the blend of Example 1 (FIG. 1). The PPMS polymer is spherical, with sphere sizes varying between 0.5 and 20 microns. PPMS is embedded in a LLDPE fibrous matrix. However, as shown in FIG. 1, the PS/LLDPE blends reveal an unordered or laminate morphology.

Figure 3:
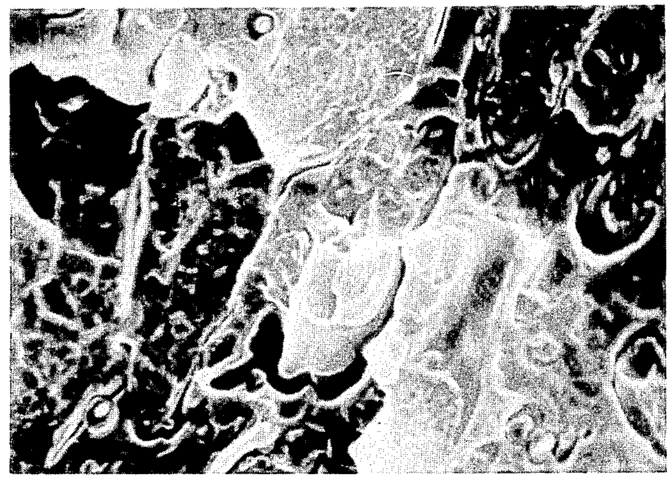
FIG. 3 is an electron photomicrograph (10,000×) of a 50:50 PS/LLDPE blend with 5% compatibilizing agent.
Figure 4:
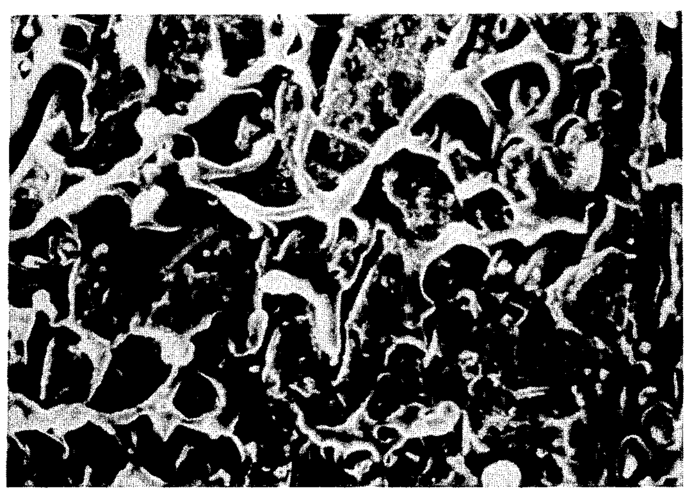
FIG. 4 is an electron photomicrograph (10,000×) of a 50:50 PPMS/LLDPE blend with 5% compatibilizing agent.

With regard to FIGS. 3 and 4, it can be seen that the PPMS/LLDPE (5% compatibilizing agent) blend of Example 3 above comprises a clearer interconnecting web matrix of LLDPE dispersed around the PPMS phase. However, the PS/LLDPE (5% compatibilizing agent) polymer of Example 8 above, as shown in FIG. 3, is characterized by an ill-defined morphology in which the PS phase cannot be defined.

It is believed that the ordered morphology of the blends of PPMS and LLDPE, as opposed to the blends of PS and LLDPE, is due to the lower interfacial tension between PPMS and LLDPE. The critical surface tension measurements are presented below in Table 1:

TABLE 1

| Polymer | Critical Surface Tension Measurement |
|---|---|
| PS | 31 dyne/cm |

TABLE 1-continued

| Polymer | Critical Surface Tension Measurement |
|---|---|
| PPMS | 28 dyne/cm |
| LLDPE | 25 dyne/cm |

The difference in critical surface tension measurement between PS and PE, i.e., 6 dyne/cm, and PPMS and LLDPE, i.e., 3 dyne/cm, indicates substantial differences not only in PS and PPMS, but in the polymer blends. The PPMS/LLDPE blend has a better interfacial adhesion than the PS/LLDPE blend, due to the fact that the critical surface tensions of PPMS is closer to LLDPE than PS.

By the process of the present invention, a compatible blend of PPMS and PE, preferably LLDPE, has been formed without the need for a compatibilizing agent or irradiation. The novel blend possesses superior impact strength and heat distortion properties.

Although the present invention has been described with preferred embodiments, it is to be understood that modifications and variations may be resorted to, without departing from the spirit and scope of this invention, as those skilled in the art will readily understand.

We claim:

1. A high molecular weight blend having high impact strength and superior heat distortion properties comprising, in combination, between 20 and 60 wt % polyethylene and between 40 and 80 wt % of a poly(para-methylstyrene)polymer, said blend containing no compatibilizing agent.

2. The blend according to claim 1, wherein said polyethylene is linear low density polyethylene.

3. The blend according to claim 1, wherein said poly(para-methylstyrene)polymer is high impact poly(-para-methylstyrene).

4. The blend according to claim 1, wherein the ratio of said polyethylene to said poly(para-methylstyrene)-polymer is between 40:60 and 60:40.

5. A high molecular weight blend having high impact strength and superior heat distortion properties, comprising, in combination, between about 40 and 60 wt % polyethylene and about 60 and 40 wt % of a poly(para-methylstyrene)polymer, said blend containing no compatabilizing agent.

6. The blend according to claim 5, wherein said polyethylene is linear low density polyethylene.

7. The blend according to claim 5, wherein said poly(para-methylstyrene)polymer is high impact poly(-para-methylstyrene).

8. The blend according to claim 6 which comprises about 50 wt % linear low density polyethylene and about 50 wt % of a poly(para-methylstyrene)polymer.

* * * * *